US009641425B2

United States Patent
Ellis et al.

(10) Patent No.: US 9,641,425 B2
(45) Date of Patent: May 2, 2017

(54) DRA DESTINATION MAPPING BASED ON DIAMETER ANSWER MESSAGE

(71) Applicant: ALCATEL-LUCENT CANADA, INC., Ottawa (CA)

(72) Inventors: Stephen E. Ellis, Ottawa (CA); Darryl Jaakkola, Carp (CA); Peter Jorgensen, Nepean (CA)

(73) Assignee: Alcatel Lucent, Boulogne-Billancourt (FR)

( * ) Notice: Subject to any disclaimer, the term of this patent is extended or adjusted under 35 U.S.C. 154(b) by 114 days.

(21) Appl. No.: 13/953,962

(22) Filed: Jul. 30, 2013

(65) Prior Publication Data
US 2015/0039774 A1    Feb. 5, 2015

(51) Int. Cl.
*G06F 15/16*  (2006.01)
*H04L 12/751*  (2013.01)
(Continued)

(52) U.S. Cl.
CPC ............ *H04L 45/08* (2013.01); *H04L 45/306* (2013.01); *H04L 67/146* (2013.01); *H04W 12/00* (2013.01)

(58) Field of Classification Search
CPC . H04L 65/1016; H04L 63/0892; H04L 69/08; H04L 65/1006; H04L 29/12188; H04L 61/1588; H04L 12/1403; H04L 12/14; H04L 29/12009; H04L 69/24; H04L 67/14; H04L 12/1407; H04L 41/0803; H04W 4/24; H04W 12/06; H04W 8/18; H04W 80/10; H04W 4/00; H04W 88/16;
(Continued)

(56) References Cited

U.S. PATENT DOCUMENTS 8,478,828 B2    7/2013  Craig et al.
2010/0299451 A1*  11/2010  Yigang ................. H04L 45/306
                                                                    709/241
(Continued)

FOREIGN PATENT DOCUMENTS

CA        2786115 A1    7/2011

OTHER PUBLICATIONS

International Search Report for PCT/CA2014/050669 dated Oct. 20, 2014.
(Continued)

*Primary Examiner* — Brian J Gillis
*Assistant Examiner* — Kamran Mohammadi
(74) *Attorney, Agent, or Firm* — Kramer & Amado, P.C.

(57) ABSTRACT

Various exemplary embodiments relate to a method of routing Diameter requests. The method includes: receiving an initial request from a client, the initial request including a session identifier, an initial destination realm, and request content; determining a Diameter route for the initial request based on the destination realm and the request content; forwarding the initial request according to the Diameter route; receiving a response to the initial request; extracting an origin realm or host from the response; and storing the origin realm or host in association with the session identifier. Various exemplary embodiments relate a Diameter Routing Agent (DRA) configured to perform the above method. Various exemplary embodiments relate to a non-transitory machine-readable storage medium encoded with instructions for performing the method.

16 Claims, 5 Drawing Sheets

(51) Int. Cl.
*H04L 29/08* (2006.01)
*H04W 12/00* (2009.01)
*H04L 12/725* (2013.01)

(58) Field of Classification Search
CPC ........... H04M 15/57; H04M 2215/208; H04M 15/63; H04M 15/66
USPC .......................................... 455/406; 726/4, 2
See application file for complete search history.

(56) References Cited

U.S. PATENT DOCUMENTS

| | | | | |
|---|---|---|---|---|
| 2011/0116382 A1* | 5/2011 | McCann | ............. | H04L 63/0263 370/241 |
| 2011/0199906 A1* | 8/2011 | Kanode et al. | ............... | 370/235 |
| 2011/0200053 A1* | 8/2011 | Kanode | .............. | H04L 63/0892 370/401 |
| 2012/0224531 A1* | 9/2012 | Karuturi | ............... | H04W 40/02 370/328 |
| 2012/0225679 A1* | 9/2012 | McCann | ................. | H04L 45/64 455/466 |
| 2012/0265888 A1* | 10/2012 | Roeland et al. | .............. | 709/228 |
| 2013/0115919 A1 | 5/2013 | Xu et al. | | |
| 2013/0151845 A1* | 6/2013 | Donovan | ............ | H04L 63/0407 713/153 |
| 2013/0227663 A1* | 8/2013 | Cadenas Gonzalez | ........... | 726/6 |
| 2013/0346549 A1 | 12/2013 | Craig et al. | | |
| 2014/0160977 A1* | 6/2014 | Serbest | ................. | H04W 40/02 370/254 |

OTHER PUBLICATIONS

European Search Report mailed Feb. 16, 2017, for EP Appl. No. 14832035.1.

Calhoun, et al., "Diameter Base Protocol", Network Working Group RFC 1717, Internet Society (ISOC) 4, Rue des Falaises CH-1205 Geneva, Switzerland (Sep. 1, 2003).

* cited by examiner

| | Session ID | Destination Realm | Destination Host | Origin Realm | Origin Host | Diameter Application | APN ID | Subscriber ID | IP Address |
|---|---|---|---|---|---|---|---|---|---|
| | 310 | 320 | 325 | 330 | 335 | 340 | 345 | 350 | 360 |
| 370a | 0x468AB8 | RealmA | | RealmC | Client2 | Gx | 0x843153 | alice@network.com | 1.2.3.4 |
| 370b | 0xAB1324 | RealmB | Host1 | RealmC | Client2 | Gx | 0x123456 | bob@network.com | 1.2.3.5 |
| 370c | 0xAB4567 | RealmA | Host2 | RealmC | Client1 | Gxx | 0x845746 | charlie@network.com | 1.2.3.6 |
| 370d | 0x789101 | RealmB | Host2 | RealmD | Client4 | Rx | 0x123456 | bob@network.com | 1.2.3.5 |

*FIG. 3*

DRA DESTINATION MAPPING BASED ON DIAMETER ANSWER MESSAGE

TECHNICAL FIELD

Various exemplary embodiments disclosed herein relate generally to communications networks.

BACKGROUND

Since its proposal in Internet Engineering Task Force (IETF) Request for Comments (RFC) 3588, the Diameter protocol has been increasingly adopted by numerous networked applications. For example, the Third Generation Partnership Project (3GPP) has adopted Diameter for various policy and charging control (PCC), mobility management, and IP multimedia subsystem (IMS) applications. As IP-based networks replace circuit-switched networks, Diameter is even replacing SS7 as the key communications signaling protocol. As networks evolve, Diameter is becoming a widely used protocol among wireless and wireline communications networks.

One significant aspect of the Diameter protocol is Diameter packet routing. Entities referred to as Diameter routing agents (DRAs) facilitate movement of packets in a network. In various deployments, DRAs may perform elementary functions such as simple routing, proxying, and redirect.

SUMMARY

A brief summary of various exemplary embodiments is presented. Some simplifications and omissions may be made in the following summary, which is intended to highlight and introduce some aspects of the various exemplary embodiments, but not to limit the scope of the invention. Detailed descriptions of a preferred exemplary embodiment adequate to allow those of ordinary skill in the art to make and use the inventive concepts will follow in later sections.

Various exemplary embodiments relate to a method of routing Diameter requests. The method includes: receiving an initial request from a client, the initial request including a session identifier, an initial destination realm, and request content; determining a Diameter route for the initial request based on the initial destination realm and the request content; forwarding the initial request according to the Diameter route; receiving a response to the initial request; extracting an origin realm from the response; and storing the origin realm as stored destination realm in association with the session identifier.

In various embodiments, the method further includes: receiving an update request, from the client, the update request including the session identifier; determining a Diameter route based on the stored destination realm; and forwarding the update request based on the Diameter route. The request content may include an optional field and the optional field may be missing from the update request.

In various embodiments, the method may further include: extracting an origin host from the response; and storing the origin host as a destination host in association with the session identifier.

In various embodiments, the method may further include receiving an update request, from the client, the update request including the session identifier; determining Diameter route based on the stored destination host; and forwarding the update request based on the Diameter route. The step of forwarding the update request toward based on the Diameter route may include modifying the update request to include the destination host.

In various embodiments, the step of storing the origin realm includes generating a mapping between the origin realm and the session identifier.

In various embodiments, the step of determining a Diameter route for the initial request based on the destination realm and the request content comprises: determining that a Diameter route does not exist for the destination realm; determining a new destination realm based on the message content; and determining a Diameter route for the new destination realm.

In various embodiments, the step of determining a Diameter route for the initial request based on the destination realm and the request content includes: determining a destination host based on the destination realm and the request content; and routing the initial request to the destination host.

In various embodiments, the method further includes: receiving a second initial request including second request content from a second client requesting a second session; determining that the second initial request is related to the session identifier based on the second request content; storing an identifier of the second session in association with the stored destination realm; and forwarding the second initial request based on the stored destination realm.

Various exemplary embodiments relate a Diameter Routing Agent (DRA) configured to perform the above method. Various exemplary embodiments relate to a non-transitory machine-readable storage medium encoded with instructions for performing the method.

It should be apparent that, in this manner, various exemplary embodiments enable a Diameter relay agent that efficiently routes requests from clients. In particular, by mapping Diameter sessions to the origin host and realm of response messages, the DRA may provide efficient routing regardless of client implementation.

BRIEF DESCRIPTION OF THE DRAWINGS

In order to better understand various exemplary embodiments, reference is made to the accompanying drawings, wherein:

FIG. 3 illustrates an exemplary data arrangement for storing a Diameter mapping;

DETAILED DESCRIPTION

Figure 1:
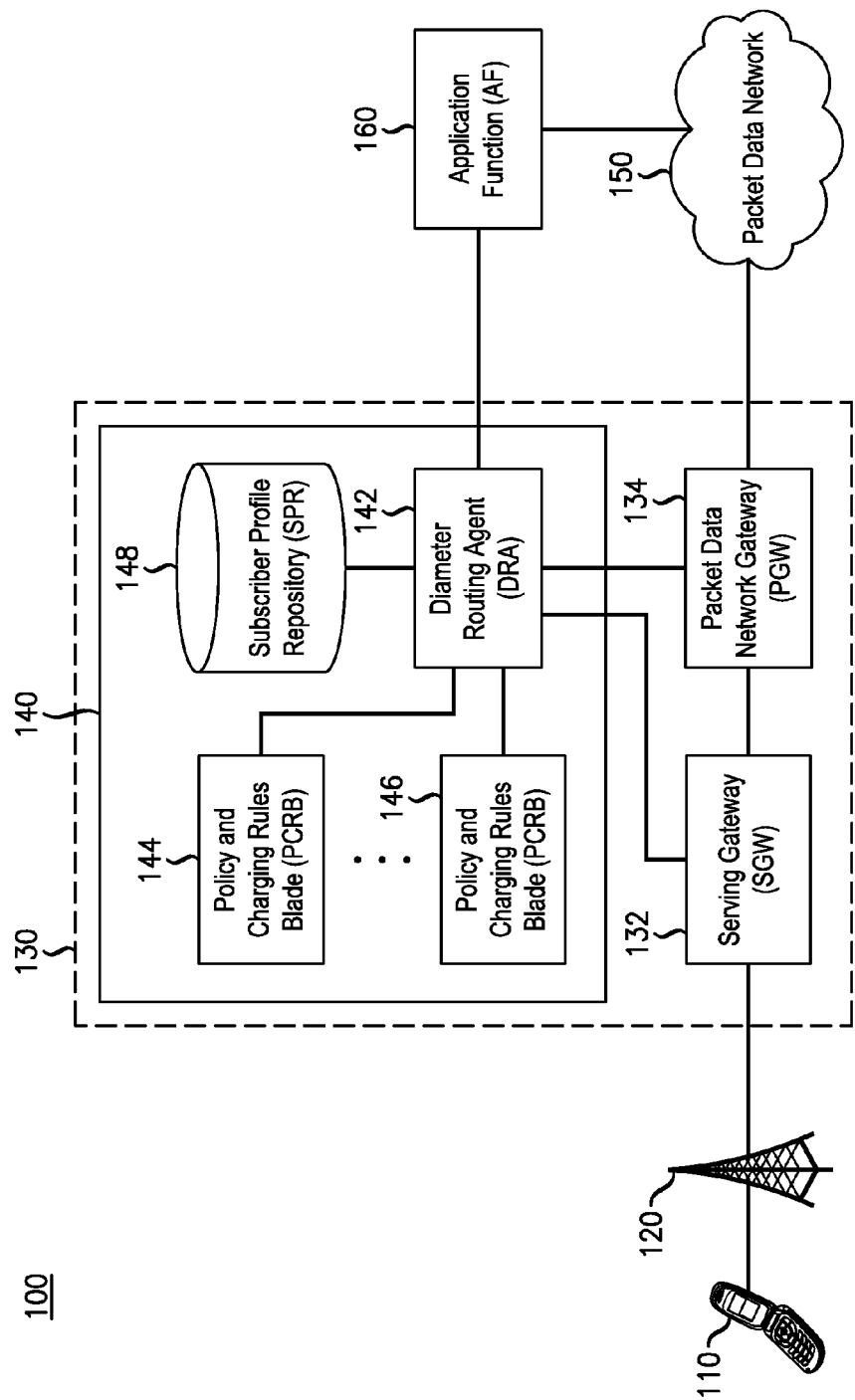
FIG. 1 illustrates an exemplary network environment for a Diameter Routing Agent (DRA)

The description and drawings illustrate the principles of the invention. It will thus be appreciated that those skilled in the art will be able to devise various arrangements that, although not explicitly described or shown herein, embody the principles of the invention and are included within its scope. Furthermore, all examples recited herein are principally intended to be for pedagogical purposes, and are to be construed as being without limitation to such specifically recited examples and conditions. Additionally, the term, "or," as used herein, refers to a non-exclusive or, unless otherwise indicated (e.g., "or else" or "or in the alternative"). Also, the various embodiments described herein are not necessarily mutually exclusive, as some embodiments may be combined with one or more other embodiments to form new embodiments.

Various Diameter clients assume that that they are directly connected to the Diameter server performing or acting upon their request. Where the network architecture involves a Diameter Relay Agent (DRA) this assumption may be false. Further, many DRA implementations are stateless; however, the messages arriving to the DRA are stateful, specific to a Diameter session which has a creation, update and termination stages. Under such scenarios, each incoming request message may require the DRA to determine where to route the Diameter message in the context of the current session. To facilitate this routing in a deterministic manner, a DRA may implement a mapping table. These mapping tables simply provide the required Destination Diameter Identity (the Diameter Destination Realm) which is used to forward-on incoming Diameter requests to the right Diameter server.

A problem may occur with Diameter clients that fail to "learn" the identity of the serving host and continue to send Diameter request messages directly to its connected Diameter peer. This inability to learn and subsequently use the true Diameter server identity results in DRAs having to repeatedly determine the location of the serving Diameter host, which may result in degraded network performance and an increase in allocated server resources. In DRA implementations that are truly stateless, there may be a need to evaluate each request message to a level enabling accurate message forwarding. For example, in an implementation that routes Diameter traffic based on subscriber subscription data, the implementation would require each message to contain the subscription ID(s). This is not optimal for reasons stated.

In view of the foregoing, it would be desirable to provide an intelligent way to ensure that DRA Diameter mappings are based on the contents of a Diameter reply. By doing so, the DRA design may be capable of "learning" the route for Diameter clients unable to do so and may subsequently use that routing information on subsequent requests.

Referring now to the drawings, in which like numerals refer to like components or steps, there are disclosed broad aspects of various exemplary embodiments.

FIG. 1 illustrates an exemplary network environment 100 for a Diameter Routing Agent (DRA) 142. Exemplary network environment 100 may be a subscriber network for providing various services. In various embodiments, subscriber network 100 may be a public land mobile network (PLMN). Exemplary subscriber network 100 may be telecommunications network or other network for providing access to various services. Exemplary subscriber network 100 may include user equipment 110, base station 120, evolved packet core (EPC) 130, packet data network 150, and application function (AF) 160.

User equipment 110 may be a device that communicates with packet data network 150 for providing the end-user with a data service. Such data service may include, for example, voice communication, text messaging, multimedia streaming, and Internet access. More specifically, in various exemplary embodiments, user equipment 110 is a personal or laptop computer, wireless email device, cell phone, tablet, television set-top box, or any other device capable of communicating with other devices via EPC 130.

Base station 120 may be a device that enables communication between user equipment 110 and EPC 130. For example, base station 120 may be a base transceiver station such as an evolved nodeB (eNodeB) as defined by the relevant 3GPP standards. Thus, base station 120 may be a device that communicates with user equipment 110 via a first medium, such as radio waves, and communicates with EPC 130 via a second medium, such as Ethernet cable. Base station 120 may be in direct communication with EPC 130 or may communicate via a number of intermediate nodes (not shown). In various embodiments, multiple base stations (not shown) may be present to provide mobility to user equipment 110. Note that in various alternative embodiments, user equipment 110 may communicate directly with EPC 130. In such embodiments, base station 120 may not be present.

Evolved packet core (EPC) 130 may be a device or network of devices that provides user equipment 110 with gateway access to packet data network 140. EPC 130 may further charge a subscriber for use of provided data services and ensure that particular quality of experience (QoE) standards are met. Thus, EPC 130 may be implemented, at least in part, according to the relevant 3GPP standards. EPC 130 may include a serving gateway (SGW) 132, a packet data network gateway (PGW) 134, and a session control device 140.

Serving gateway (SGW) 132 may be a device that provides gateway access to the EPC 130. SGW 132 may be one of the first devices within the EPC 130 that receives packets sent by user equipment 110. Various embodiments may also include a mobility management entity (MME) (not shown) that receives packets prior to SGW 132. SGW 132 may forward such packets toward PGW 134. SGW 132 may perform a number of functions such as, for example, managing mobility of user equipment 110 between multiple base stations (not shown) and enforcing particular quality of service (QoS) characteristics for each flow being served. In various implementations, such as those implementing the Proxy Mobile IP standard, SGW 132 may include a Bearer Binding and Event Reporting Function (BBERF). In various exemplary embodiments, EPC 130 may include multiple SGWs (not shown) and each SGW may communicate with multiple base stations (not shown).

Packet data network gateway (PGW) 134 may be a device that provides gateway access to packet data network 140. PGW 134 may be the final device within the EPC 130 that receives packets sent by user equipment 110 toward packet data network 140 via SGW 132. PGW 134 may include a policy and charging enforcement function (PCEF) that enforces policy and charging control (PCC) rules for each service data flow (SDF). Therefore, PGW 134 may be a policy and charging enforcement node (PCEN). PGW 134 may include a number of additional features such as, for example, packet filtering, deep packet inspection, and subscriber charging support. PGW 134 may also be responsible for requesting resource allocation for unknown application services.

Session control device 140 may be a device that provides various management or other functions within the EPC 130. For example, session control device 140 may provide a Policy and Charging Rules Function (PCRF). In various embodiments, session control device 140 may include an Alcatel Lucent 5780 Dynamic Services Controller (DSC). Session control device 140 may include a DRA 142, a plurality of policy and charging rules blades (PCRBs) 144, 146, and a subscriber profile repository.

As will be described in greater detail below, DRA 142 may be an intelligent Diameter Routing Agent. As such, DRA 142 may receive, process, and transmit various Diameter messages. DRA 142 may include a number of user-defined rules that govern the behavior of DRA 142 with regard to the various Diameter messages DRA 142 may encounter. Based on such rules, the DRA 142 may operate as a relay agent, proxy agent, or redirect agent. For example, DRA 142 may relay received messages to an appropriate recipient device. Such routing may be performed with respect to incoming and outgoing messages, as well as messages that are internal to the session control device.

Policy and charging rules blades (PCRB) 144, 146 may each be a device or group of devices that receives requests for application services, generates PCC rules, and provides PCC rules to the PGW 134 or other PCENs (not shown). For example, each of PCRB 144 and 146 may be a blade server. PCRBs 144, 146 may be in communication with AF 160 via an Rx interface. As described in further detail below with respect to AF 160, PCRB 144, 146 may receive an application request in the form of an Authentication and Authorization Request (AAR) from AF 160. Upon receipt of an AAR, PCRB 144, 146 may generate at least one new PCC rule for fulfilling the application request.

PCRB 144, 146 may also be in communication with SGW 132 and PGW 134 via a Gxx and a Gx interface, respectively. PCRB 144, 146 may receive an application request in the form of a credit control request (CCR) from SGW 132 or PGW 134. As with an AAR, upon receipt of a CCR, PCRB 144, 146 may generate at least one new PCC rule for fulfilling the application request. In various embodiments, the AAR and the CCR may represent two independent application requests to be processed separately, while in other embodiments, the AAR and the CCR may carry information regarding a single application request and PCRB 144, 146 may create at least one PCC rule based on the combination of the AAR and the CCR. In various embodiments, PCRB 144, 146 may be capable of handling both single-message and paired-message application requests.

Upon creating a new PCC rule or upon request by the PGW 134, PCRB 144, 146 may provide a PCC rule to PGW 134 via the Gx interface. In various embodiments, such as those implementing the proxy mobile IP (PMIP) standard for example, PCRB 144, 146 may also generate QoS rules. Upon creating a new QoS rule or upon request by the SGW 132, PCRB 144, 146 may provide a QoS rule to SGW 132 via the Gxx interface.

Subscriber profile repository (SPR) 148 may be a device that stores information related to subscribers to the subscriber network 100. Thus, SPR 148 may include a machine-readable storage medium such as read-only memory (ROM), random-access memory (RAM), magnetic disk storage media, optical storage media, flash-memory devices, or similar storage media. SPR 148 may be a component of one of PCRB 144, 146 or may constitute an independent node within EPC 130 or session control device 140. Data stored by SPR 138 may include subscriber information such as identifiers for each subscriber, bandwidth limits, charging parameters, and subscriber priority.

Packet data network 150 may be any network for providing data communications between user equipment 110 and other devices connected to packet data network 150, such as AF 160. Packet data network 150 may further provide, for example, phone or Internet service to various user devices in communication with packet data network 150.

Application function (AF) 160 may be a device that provides a known application service to user equipment 110. Thus, AF 160 may be a server or other device that provides, for example, a video streaming or voice communication service to user equipment 110. AF 160 may further be in communication with the PCRB 144, 146 of the EPC 130 via an Rx interface. When AF 160 is to begin providing known application service to user equipment 110, AF 160 may generate an application request message, such as an authentication and authorization request (AAR) according to the Diameter protocol, to notify the PCRB 144, 146 that resources should be allocated for the application service. This application request message may include information such as an identification of the subscriber using the application service, an IP address of the subscriber, an APN for an associated IP-CAN session, or an identification of the particular service data flows that must be established in order to provide the requested service.

Figure 2:
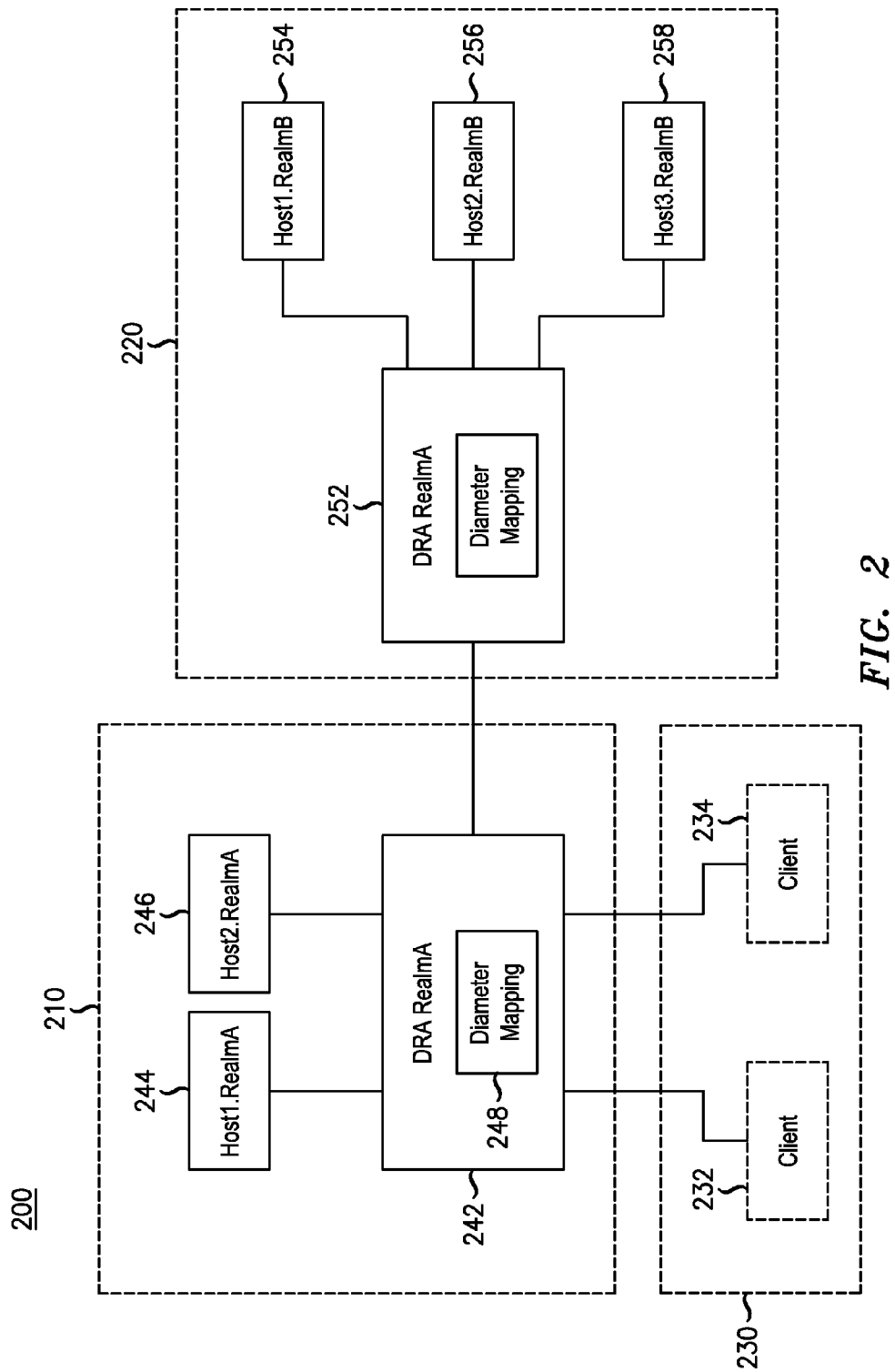
FIG. 2 illustrates another exemplary network environment having multiple Diameter Routing Agents (DRA).

FIG. 2 illustrates another exemplary network environment 200 having multiple Diameter Routing Agents (DRA) 242, 252. Exemplary network environment 200 may be a PLMN as described above regarding FIG. 1, but may also include any network environment using Diameter routing. Exemplary network environment 200 may include Diameter realms 210, 220, and 230. Diameter realms 210 and 220 may be, for example, networks operated by different service providers or different regions of a network operated by a single provider. Exemplary network 200 may also include a plurality of hosts, 244, 246, located within realm 210 and a plurality of hosts 254, 256, and 258 located within the realm 220. Exemplary network 200 may also include one or more DRAs 242, 252 and a plurality of clients 232 and 234 located in realm 230.

A Diameter realm may include a DRA configured to receive messages addressed to the realm. For example, realm 210 may include DRA 242. DRA 242 may be a standalone device or a component of another system. For example, DRA 200 may correspond to DRA 142 of exemplary environment 100. In such an embodiment, DRA 142 may support various Diameter applications defined by the 3GPP such as Gx, Gxx, Rx, or Sp. DRA 242 may include a plurality of physical ports connecting DRA 242 to a plurality of clients and hosts. For example, in various embodiments, DRA 242 may be a blade server sharing a backplane bus with hosts 244 and 246. DRA 242 may also be in communication with external hosts via a connection such as an Ethernet connection. DRA 242 may route Diameter messages to a physical port corresponding to a Diameter route or Diameter identity.

DRA 242 may receive all requests directed to an address, such as RealmA. As described above, DRA 242 may determine a Diameter route for a request and forward the request to the correct host or to another realm 220 via a physical port. For example, DRA 242 may receive a message such as a CCR message from client 232 indicating a destination realm of perfrealm. DRA 242 may determine that perfrealm does not correspond to an actual realm 210 or 220. For example, client 232 may assume a direct connection to a PCRF and always use the destination realm of perfrealm. DRA 242 may determine a Diameter route for the message based on the destination realm and message content. For example, the message may include a subscriber ID as message content that may be used to select a host within the destination realm. DRA 242 may route the message to a local host such as for example, host 244 or host 246. Alternatively, DRA 242 may route the message to a different realm, for example, realm 220. For example, if DRA 242 determines that the subscriber is associated with a different region of the network, DRA 242 may route the message to the subscriber's home region, which may be processed, for example, by a host 256 located in realm 220.

Various clients, for example client 232 and client 234 may be in communication with a DRA. For example, client 232 and client 234 may communicate directly with DRA 242. Client 232 may send Diameter messages indicating a Diameter realm of RealmA. DRA 242 may receive the Diameter message addressed to RealmA and perform Diameter routing based on the contents of the message. DRA 242 may then forward the Diameter message to a host, such as, for example, host 244 with the address Host1.RealmA or a host in a different realm, for example, Host2.RealmB.

In various embodiments, a client 232 may be configured as if directly connected to the host. The client 232 may include the same destination realm in all messages. The destination realm may or may not correspond to a publicly addressable realm used by DRA 242. DRA 242 may include diameter mapping 248. Diameter mapping 248 may map a session identifier or other common identifier to a Diameter destination. Accordingly, Diameter mapping 248 may be used to simplify the determination of a Diameter route. For example, the Diameter identity for the destination of subsequent Diameter requests may be determined by looking up the session ID in the diameter mapping 248 rather than determining the destination based on the message contents.

FIG. 3 illustrates an exemplary data arrangement 300 for storing a Diameter mapping 248. Data arrangement 300 may be stored in a non-transitory machine-readable storage medium of DRA 242 and accessed by a processor of DRA 242 for making routing decisions. Data arrangement 300 may include a plurality of fields identifying characteristics of a Diameter session. For example, exemplary data arrangement 300 may include a session ID field 310, destination realm field 320, a destination host field 325, an origin realm field 330, and origin host field 335, a Diameter application field 340, an APN ID field 345, a subscriber ID field 350, and an IP address field 360. Exemplary data arrangement 300 may also include other fields (not shown) corresponding to other Diameter information such as header information and content. Data arrangement 300 may include one or more entries 370 corresponding to Diameter sessions.

Session ID field 310 may indicate a session identifier assigned to the Diameter session. The session identifier may be assigned to the session upon receipt of a session initialization message. The session identifier may be included in a Diameter header of each subsequent message within the Diameter session.

Destination realm field 320 may indicate a realm of a host of the Diameter session. Destination host field 325 may indicate a name of the host of the Diameter session. Together, destination realm field 320 and destination host field 325 may be referred to as a Diameter identity. The Diameter identity may be a fully qualified domain name uniquely identifying the host. In various embodiments, the Diameter identity may include only a realm of the host in destination realm field 320. As will be described in further detail below, the destination realm field 320 and destination host field 325 may be based on the origin realm or host of a message received in response to a session initiation message. The destination host field 325 may be left empty until the response is received. For example, entry 370a may illustrate an entry for a session where the response has not been received. Accordingly, the Diameter mapping 300 may be used to map other identifiers to the host of the session.

Diameter application field 340 may indicate the Diameter application associated with the Diameter session. In various embodiments, session identifiers may be unique within a Diameter application. Diameter application field 340 may be used in association with session ID field 310 to uniquely identify the Diameter session. Diameter application field 340 may also be used to identify sessions for different applications that may be linked together. For example, DRA 242 may use the diameter mapping 300 to relay messages of associated sessions to the same Diameter host. For example, an application function such as AF 160 may initiate a Rx session for a subscriber associated with the Gx session for the subscriber. The DRA 242 may associate the Rx AAR message with the Gx session based on common information such as APN ID field 345, subscriber ID field 350, or user device IP address field 360. DRA 242 may use the stored Diameter identity to route messages from either PGW 134 or related messages from AF 160 to the same Diameter host. Likewise, Diameter application field 340 may indicate that the session is a related Gxx session or any other related Diameter application where requests may be processed by the same host. In various embodiments, each session may include its own entry 360 and DRA 242 may correlate sessions based on common information.

APN ID field 345 may include an access point name or called station ID for the session. Subscriber ID field 350 may include an identifier of a subscriber associated with the Diameter session. In various embodiments, the DRA 242 may use the subscriber ID to route an initial Diameter request. Subscriber ID field 350 may be useful for analyzing subsequent messages that do not include the subscriber ID. IP address field 360 may include an IP address such as an IPv4 address or IPv6 prefix. DRA 242 may use APN ID field 345, subscriber ID field 350, or IP address field 360 to correlate a plurality of sessions where messages relate to the same user device and host.

Figure 4:
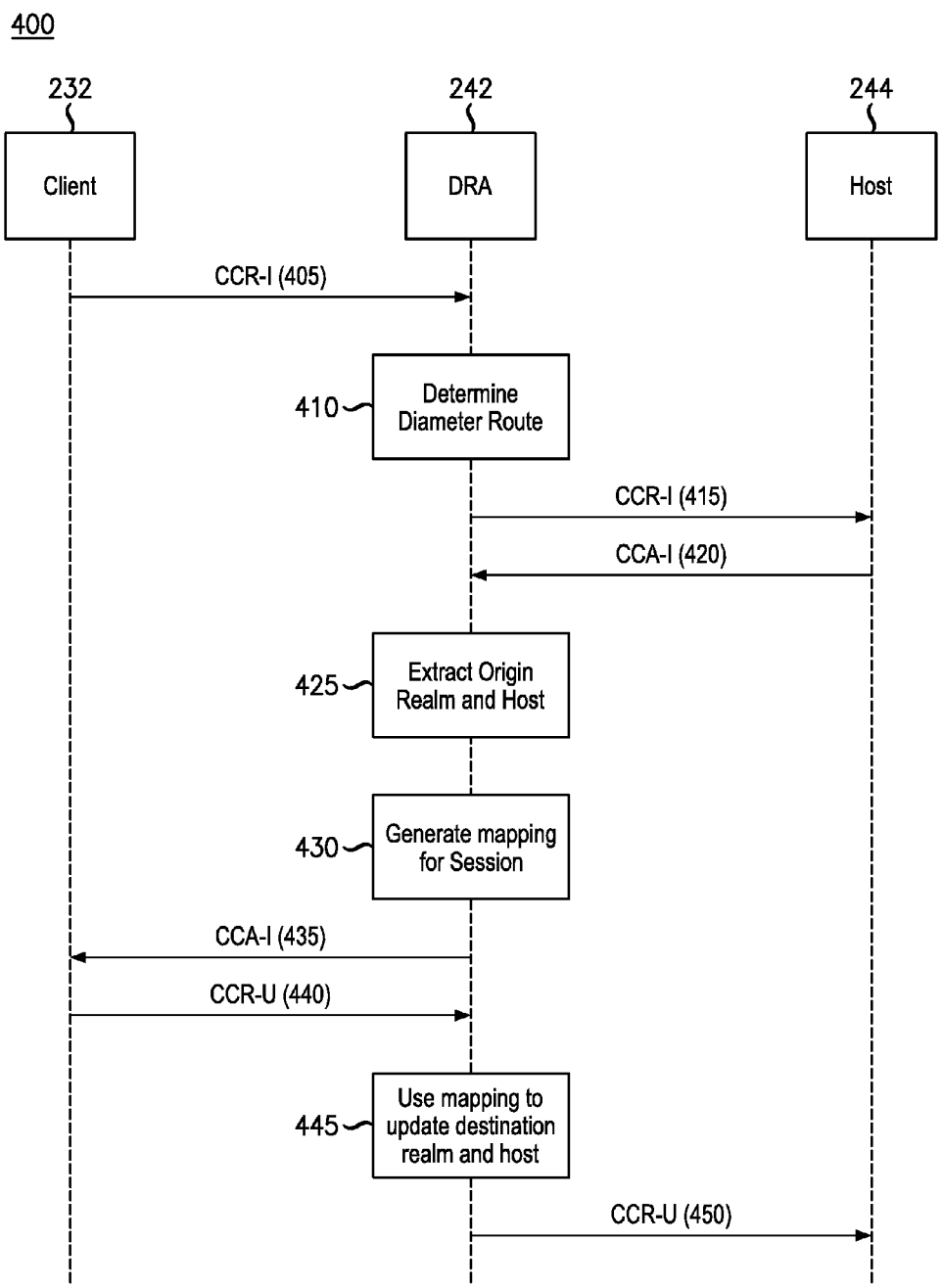
FIG. 4 illustrates a message diagram illustrating methods of processing Diameter messages.

FIG. 4 illustrates an exemplary message diagram 400 illustrating methods of processing Diameter messages. An arrow in FIG. 4 may illustrate a message sent from one network node to another network node. Accordingly, an arrow may represent both a step of sending the message and a step of receiving the message. A Diameter message may include a plurality of fields or attribute value pairs (AVPs). Various fields of the Diameter message may be required by a Diameter application while other messages are optional.

In step 405, a Diameter client 232 may send a session initiation message to DRA 242. For example, the session initiation message may be a CCR initial message. The session initiation message may include required fields such as a session ID and an OriginHost and OriginRealm identifying the Diameter client 232. The session initiation message may also include a DestinationRealm identifying the realm of host 244. As discussed above, the session initiation message may incorrectly identify the actual DestinationRealm and may not include a DestinationHost identifying host 244. The session initiation message may further include optional content fields such as a subscriber-ID.

In step 410, the DRA 242 may determine a Diameter route for the session initiation message. The Diameter route may include a physical port associated with a Diameter identity of the host 244. The physical port may be directly connected to the host 244 or may be connected via one or more intermediate network nodes. In various embodiments, the DRA 242 may consider a number of factors in determining the Diameter route. For example, DRA 242 may assign a session initiation request to a local PCRB based on message contents such as a subscriber ID. DRA 242 may also determine that the session initiation message should be routed to a different DRA 252. Alternatively, DRA 242 may view an additional DRA as another realm or host that processes messages regardless of specific architecture.

In step 415, DRA 242 may forward the session initiation request message to a host 244 based on the determined Diameter routing. In various embodiments, DRA 242 may forward the session initiation request message as received. In various alternative embodiments, DRA 242 may modify the session initiation request message. For example, DRA 242 may update a destination realm based on the determined Diameter routing or add a destination host to the session initiation request message.

In step 420, host 244 may send a response to the session initiation request message. The response may be, for example, a CCA message. The response may include an OriginHost and OriginRealm describing the host 244. The response may also include content regarding the Diameter session.

In step 425, DRA 242 may extract the OriginHost and OriginRealm from the CCA answer. The extracted OriginHost and OriginRealm may be more accurate or more specific than the Diameter identity based on the session initiation request. For example, the OriginHost and OriginRealm may indicate a host that is located behind another DRA 252 whereas the original Diameter identity only indicated the other DRA 252. As another example, the OriginHost may identify a specific host 244, whereas the DestinationRealm of the session initiation request included only a DestinationRealm.

In step 430, the DRA 242 may create an entry 370 in Diameter mapping 248 for the requested session based on the session initiation request and the response. As described above, the entry 370 may include the session ID field 310, Diameter origin realm field 330, origin host field 335, application field 340, APN ID field 345, subscriber ID field 350, and IP address field 360 from the session initiation request message. DRA 242 may store the OriginRealm and OriginHost extracted from the response in destination realm field 320 and destination host field 325.

In various embodiments, creation of the entry 370 may occur immediately following the receipt of the session initiation message. In such embodiments, the DRA 242 may fill destination realm field 320 and destination host field 325 based on the destination realm included in the session initiation request, or a Diameter identity determined by the DRA 242. The destination realm field 320 and destination host field 325 may also be initially left empty until the response is received.

In step 435, the DRA 242 may forward the response to client 232. The routing of the response may be based on the OriginHost of the session initiation request message. DRA 242 may forward the response to the client 232 without any changes.

In step 440, the client 232 may send an update request to DRA 242. The update request may, in some respects, be similar to the session initiation request sent in step 405. The update request may include the session ID, OriginHost, and OriginRealm. The DestinationRealm of the update request may vary depending on the implementation of client 232. In various embodiments, the DestinationRealm of the update request may include the OriginRealm of the response. The update request may also include a DestinationHost that matches the OriginHost of the response. In various embodiments, such as where the client 232 is configured as if it were directly connected to a host, the DestinationRealm of the update request may be the same as the DestinationRealm of the session initiation message. The update request may be missing fields that were included in the session initiation request. For example, a subscriber ID may be missing from the update request.

In step 445, the DRA 242 may use the Diameter mapping 248 to determine a Diameter route for the update message. DRA 242 may look up the session ID field 310 in Diameter mapping 248 and determine the associated Diameter identity field 330. DRA 242 may also determine a physical port for the Diameter identity.

In step 450, DRA 242 may forward the update request to host 244 based on the stored Diameter identity. DRA 242 may also modify the update request to include the Diameter identity. The DRA 242 may replace the DestinationRealm or DestinationHost of the update request with information from the stored Diameter identity 320.

Figure 5:
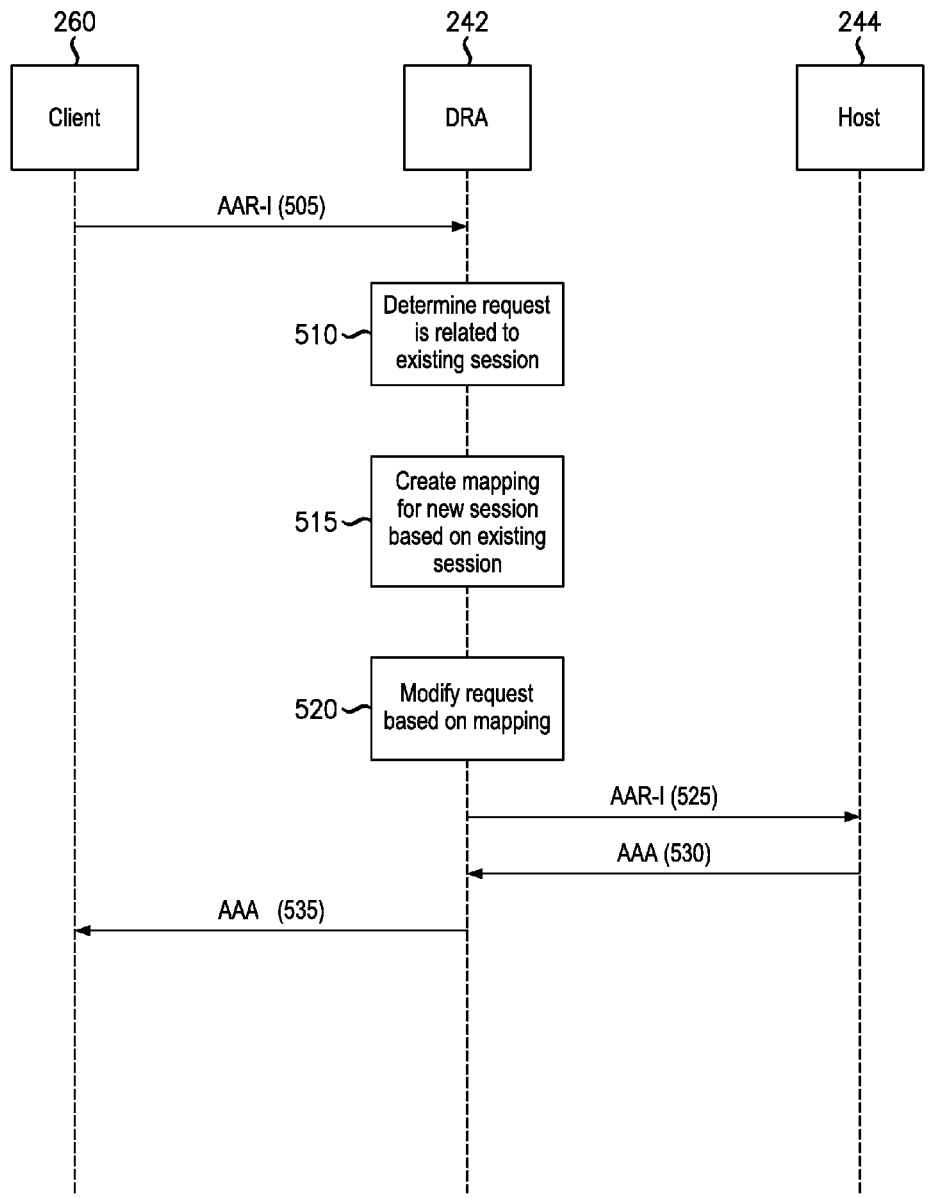
FIG. 5 illustrates a message diagram illustrating further methods of processing Diameter messages.

FIG. 5 illustrates an exemplary message diagram 500 illustrating further methods of processing Diameter messages. An arrow in FIG. 5 may illustrate a message sent from one network node to another network node. Accordingly, an arrow may represent both a step of sending the message and a step of receiving the message. A Diameter message may include a plurality of fields or attribute value pairs (AVPs). Various fields of the Diameter message may be required by a Diameter application while other messages are optional. The methods illustrated by FIG. 5 may be performed following the methods illustrated by FIG. 4.

In step 505, a Diameter client 260 may send a second session initiation request to DRA 242. The Diameter client 260 may be a second network node such as AF 150. The second session initiation request may be a request for a session related to the first Diameter session. For example, Diameter client 260 may request an AF session using the Rx Diameter application for an application provided by the connection associated with a Gx Diameter application session.

In step 510, the DRA 242 may determine that the second session initiation request is related to an existing session. DRA 242 may compare content information of the second session initiation request with the fields stored in data arrangement 300. For example, DRA 242 may determine that two sessions are related based on an APN ID field 345, subscriber ID field 350, or IP address field 360.

In step 515, DRA 242 may create a mapping for the second requested session based on the existing session. For example, DRA 242 may create a new entry 370d in data arrangement 300 based on a match with existing entry 370b. In particular, the new entry 370d may include the same destination realm field 320 and destination host field 325 as the matching session. Information specific to the new session, such as the session ID field 310, origin realm field 330, origin host field 335, and Diameter application field 340 may be based on the second session initiation request.

In step 520, DRA 242 may modify the second session initiation request based on the mapping. DRA 242 may replace the destination realm or destination host of the second session initiation request with the stored destination realm field 320 and destination host field 325. DRA 242 may then determine a Diameter route based on the updated destination realm and destination host.

In step 525, DRA 242 may forward the second session initiation request to host 244. Host 244 may be the same host 244 as the host receiving the first session initiation request. For example, host 244 may be a single PCRB that processes and makes policy decisions regarding both a Gx session and an Rx session for a subscriber. In step 530, host 244 may provide a response to the second session initiation request. For example, the second initiation request may be an AA-Answer message. In step 535, DCA 242 may forward the response to the client 260.

According to the foregoing, various exemplary embodiments provide for a Diameter relay agent that efficiently routes requests from clients. In particular, by mapping Diameter sessions to the origin host and realm of response messages, the DRA may provide efficient routing regardless of client implementation.

It should be apparent from the foregoing description that various exemplary embodiments of the invention may be implemented by hardware. Furthermore, various exemplary embodiments may be implemented as instructions stored on a machine-readable storage medium, which may be read and executed by at least one processor to perform the operations described in detail herein. A machine-readable storage medium may include any mechanism for storing information in a form readable by a machine, such as a personal or laptop computer, a server, or other computing device. Thus, a tangible and non-transitory machine-readable storage medium may include read-only memory (ROM), random-access memory (RAM), magnetic disk storage media, optical storage media, flash-memory devices, and similar storage media.

It should be appreciated by those skilled in the art that any block diagrams herein represent conceptual views of illustrative circuitry embodying the principals of the invention. Similarly, it will be appreciated that any flow charts, flow diagrams, state transition diagrams, pseudo code, and the like represent various processes which may be substantially represented in machine readable media and so executed by a computer or processor, whether or not such computer or processor is explicitly shown.

Although the various exemplary embodiments have been described in detail with particular reference to certain exemplary aspects thereof, it should be understood that the invention is capable of other embodiments and its details are capable of modifications in various obvious respects. As is readily apparent to those skilled in the art, variations and modifications can be affected while remaining within the spirit and scope of the invention. Accordingly, the foregoing disclosure, description, and figures are for illustrative purposes only and do not in any way limit the invention, which is defined only by the claims.

What is claimed is:

1. A method of routing Diameter requests by an agent device, the method comprising:
   receiving an initial Diameter request from a client, the initial Diameter request including a destination realm indication which identifies a destination realm comprising at least one Diameter server host;
   determining a route to a server host of the at least one Diameter server host based on the destination realm indication;
   forwarding the initial Diameter request according to the determined route;
   maintaining a mapping of the destination realm indication to a Diameter session identifier corresponding to the initial Diameter request;
   receiving a response to the initial Diameter request, the response including an origin host and an origin realm indication;
   updating the mapping by applying the origin host indication from the response as a destination host indication in the mapping; and
   forwarding a received subsequent Diameter request having the Diameter session identifier corresponding to the mapping, based on the destination realm and the destination host indication in the mapping
   receiving a second initial request including second request content from a second client requesting a second session;
   determining that the second initial request is related to the Diameter session identifier based on the second request content; and
   storing an identifier of the second session in association with the stored destination realm; and forwarding the second initial request based on the stored destination realm.

2. The method of claim 1, wherein request content includes an optional field and the optional field is missing from an update request.

3. The method of claim 1, further comprising:
   extracting the origin host from the response;
   storing the origin host as a destination host in association with the Diameter session identifier.

4. The method of claim 3, further comprising:
   receiving an update request, from the client, the update request including the Diameter session identifier;
   determining a Diameter route based on the Diameter session identifier and the stored destination host; and
   forwarding the update request based on the Diameter route.

5. The method of claim 4, wherein the step of forwarding the update request based on the Diameter route comprises modifying the update request to include the destination host.

6. The method of claim 1, further comprising:
   determining that a Diameter route does not exist for the destination realm;
   determining a new destination realm based on message content; and
   determining a new Diameter route for the new destination realm.

7. The method of claim 1, further comprising:
   determining a destination host based on the destination realm and request content; and
   routing the initial request to the destination host.

8. A non-transitory machine-readable storage medium encoded with instructions executable by a processor for routing Diameter requests, the non-transitory machine-readable storage medium comprising:
   instructions for receiving an initial Diameter request from a client, the initial request including a destination realm indication which identifies a destination realm comprising at least one Diameter server host;
   instructions for determining a route to a server host of the at least one Diameter server host based on the destination realm indication;
   instructions for forwarding the initial Diameter request according to the determined route;
   instructions for maintaining a mapping of the destination realm indication to a Diameter session identifier corresponding to the initial Diameter request;
   instructions for receiving a response to the initial Diameter request, the response including an origin host and an origin realm indication;
   instructions for updating the mapping by applying the origin host indication from the response as a destination host indication in the mapping; and
   instructions for forwarding a received subsequent Diameter request having the Diameter session identifier corresponding to the mapping, based on the destination realm and the destination host indication in the mapping instructions for receiving a second initial request including second request content from a second client requesting a second session;
instructions for determining that the second initial request is related to the Diameter session identifier based on the second request content;
instructions for storing an identifier of the second session in association with the stored destination realm; and
instructions for forwarding the second initial request based on the stored destination realm.

9. The non-transitory machine-readable storage medium of claim 8, wherein request content includes an optional field and the optional field is missing from an update request.

10. The non-transitory machine-readable storage medium of claim 8, further comprising:
instructions for extracting an origin host from the response; and
instructions for storing the origin host as the destination host in association with the Diameter session identifier.

11. The non-transitory machine-readable storage medium of claim 10, further comprising:
instructions for receiving an update request from the client, the update request including the Diameter session identifier;
instructions for determining a destination host based on the Diameter session identifier and the stored destination host; and
instructions for forwarding the update request toward the destination host.

12. The non-transitory machine-readable storage medium of claim 11, wherein the instructions for forwarding the update request toward the destination host further comprise:
instructions for modifying the update request to include the destination host.

13. The non-transitory machine-readable storage medium of claim 11, further comprising:
instructions for determining that a Diameter route does not exist for the destination realm;
instructions for determining a new destination realm based on the message content; and
instructions for determining a new Diameter route for the new destination realm.

14. The non-transitory machine-readable storage medium of claim 8, further comprising:
instructions for determining a destination host based on the destination realm and request content; and
instructions for routing the initial request to the destination host.

15. A Diameter relay agent (DRA) in communication with a client and a plurality of hosts, wherein the DRA is configured to: receive an initial Diameter request from a client, the initial request including a destination realm indication which identifies a destination realm comprising at least one Diameter server host; determine a route to a server host of the at least one Diameter server host based on the destination realm indication; forward the initial Diameter request according to the determined route; maintain a mapping of the destination realm indication to a Diameter session identifier corresponding to the initial Diameter request; receive a response to the initial Diameter request, the response including an origin host and an origin realm indication; update the mapping by applying the origin host indication from the response as a destination host indication in the mapping; and forward a received subsequent Diameter request having the session identifier corresponding to the mapping, based on the destination realm and the destination host indication in the mapping; receive a second initial Diameter request including second request content from a second client requesting a second session; determine that the second initial Diameter request is related to the Diameter session identifier based on the second request content; store an identifier of the second session in association with the stored destination realm; and forward the second initial Diameter request based on the stored destination realm.

16. A method of routing Diameter requests, the method comprising:
receiving an initial request from a client, the initial request including a session identifier, an initial destination realm, and request content, wherein the session identifier is a Diameter session identification, the initial destination realm identifies a destination realm of a Diameter host, and the request content is a subscriber ID;
determining a Diameter route for the initial request based on the initial destination realm and the request content;
forwarding the initial request according to the Diameter route;
receiving a response to the initial request;
extracting an origin realm from the response;
storing the origin realm as a stored destination realm in association with the session identifier;
receiving a second initial request including second request content from a second client requesting a second session;
determining that the second initial request is related to the session identifier based on the second request content;
storing an identifier of the second session in association with the stored destination realm; and
forwarding the second initial request based on the stored destination realm.

\* \* \* \* \*